United States Patent [19]

Sohner et al.

[11] Patent Number: 5,025,452
[45] Date of Patent: Jun. 18, 1991

[54] FULL-DUPLEX, SUB-BAND SPREAD SPECTRUM COMMUNICATIONS SYSTEM

[75] Inventors: Harold K. Sohner, Richardson; Joel N. Hoyloak, Lucas; Richard J. Girvin, Plano, all of Tex.; Surinder Kumar, Saskatoon, Canada

[73] Assignee: Andrew Corporation, Orland Park, Ill.

[21] Appl. No.: 496,332

[22] Filed: Mar. 20, 1990

[51] Int. Cl.$^5$ .............................................. H04K 1/00
[52] U.S. Cl. ....................................................... 375/1
[58] Field of Search ................................ 375/1; 380/34

[56] References Cited

U.S. PATENT DOCUMENTS

| | | | |
|---|---|---|---|
| 4,291,410 | 9/1981 | Caples et al. | 375/1 |
| 4,313,211 | 1/1982 | Leland | 455/139 |
| 4,320,514 | 3/1982 | Haskell | 375/1 |
| 4,481,640 | 11/1984 | Chow et al. | 375/1 |
| 4,554,668 | 11/1985 | Deman et al. | 375/1 |
| 4,592,009 | 5/1986 | Masheff | 364/821 |
| 4,596,254 | 6/1986 | Adrian et al. | 128/666 |
| 4,599,732 | 7/1986 | LeFever | 375/13 |
| 4,617,674 | 10/1986 | Mangulis et al. | 375/1 |
| 4,648,099 | 3/1987 | Kerr | 375/47 |
| 4,653,076 | 3/1987 | Jerrim et al. | 375/115 |
| 4,672,605 | 6/1987 | Hustig et al. | 370/76 |
| 4,829,540 | 5/1989 | Waggener, Sr. et al. | 375/1 |
| 4,850,036 | 7/1989 | Smith | 375/1 |
| 4,866,732 | 9/1989 | Carey et al. | 375/1 |

OTHER PUBLICATIONS

Cooper et al., "A Spread-Spectrum Technique for High-Capacity Mobile Communications," IEEE Trans. on Veh. Tech., vol. VT-27, No. 4, Nov. 1978.
B. G. Glazer, "Spread Spectrum Concepts-A Tutorial," Proc. of the 1973 Symposium On Spread Spectrum Communications, vol. 1, Technical Document 271, pp. 5-8.

Primary Examiner—Salvatore Cangialosi
Attorney, Agent, or Firm—Kareem M. Irfan

[57] ABSTRACT

An improved spread spectrum communications system is provided for establishing full-duplex voice/data radio communications within a single specified FCC ISM band. Spectrum spreading is performed relative to a plurality of sub-bands respectively defined about the lower and upper band-edges of the prescribed ISM band and having spectral roll-off characteristics which satisfy FCC requirements for radio frequency radiation outside the ISM bands on the corresponding band-edges thereof. Full-duplex operation is implemented by the use of digital MSK modulation and associated filtering in order to conserve available bandwidth and accommodate the filtered, modulated signal within the sub-bands defined in the prescribed ISM frequency band, and the system is capable of being easily interfaced to related digital communications services.

18 Claims, 5 Drawing Sheets

FULL-DUPLEX, SUB-BAND SPREAD SPECTRUM COMMUNICATIONS SYSTEM

FIELD OF THE INVENTION

The present invention generally relates to voice and data communication systems using spread spectrum techniques. More particularly, this invention relates to an improved spread spectrum communications system adapted to sub-band, full-duplex operation.

BACKGROUND OF THE INVENTION

Spectrum spreading, primarily because of its inherent resistance to interference, is increasingly being used as the basis for voice/data communications systems, particularly in applications where rejection of unwanted signals and interference of unknown characteristics is critical. Spread spectrum technology encompasses a variety of signalling techniques where the transmitted signals occupy a bandwidth far exceeding that of the input/output baseband signal. In a spread spectrum system, the ratio of the transmitted signal bandwidth to the baseband bandwidth (usually referred to as the "processing gain") generally ranges from 10 to $10^6$ or more; accordingly, the frequency spread of the transmitted signal is substantially larger than the minimum bandwidth required for signal transmission.

In spread spectrum systems, the bandwidth of the transmitted signal is relatively independent of the input/output baseband signal, but is primarily determined by an auxiliary signal having known characteristics at the transmitter unit and at the intended receiver units. Broad-banding (or spreading) of the transmitted signals is achieved by subjecting the RF carrier at the transmitter to a double modulation process—one by the baseband signal and the other by a spectrum spreading sequence.

Spectrum spreading is most commonly implemented by phase shift keying (PSK) modulation of a carrier by a high-speed digital code sequence having a rate much faster than the baseband data rate. The sequences used are pseudo-random in nature and phase keying of a binary or higher order (generally quaternary) is used. Where very large transmission signal bandwidths are involved, frequency hopping is used to realize spreading by frequency shift keying (FSK) using a relatively low-speed code sequence at a rate comparable to the data rate. A relatively uncommon approach to spectrum spreading is time hopping wherein time segments of the baseband waveform are time-compressed and transmitted in accordance with a low-speed code sequence which governs the time of transmission.

Signal transmission by spread spectrum techniques realizes several important advantages accruing from the coded signal format and the resulting wide signal bandwidth. These advantages include the capabilities of selective addressing by the use of assigned reference codes to plural receivers, signal suppression by exploiting the low power density of frequency spread signals, enhanced message integrity against signal snooping, multiple access for code division multiplexing, and high resolution ranging because of extreme sensitivity to transmission time. The major advantage of spread spectrum systems, however, is the inherent resistance to interference resulting from the fact that undesired signals are spread in the receiver so that the noise power is spread over a wide bandwidth, whereas the desired signal is collapsed or de-spread at the receiver, thereby allowing for effective filtering of the undesired noise signals.

For purposes of background information dealing with conventional spread spectrum systems, as well as for supplemental information dealing with modular segments of the illustrative embodiments set forth herein but not discussed in detail because they are well recognized in the art, the reader's attention is directed to the following references: U.S. Pat. No. 4,866,732, issued Sept. 12, 1989, dealing with a wireless telephone communication based on spectrum spreading of RF signals; U.S. Pat. Nos. 4,455,651, and 4,086,504, respectively issued on June 19, 1984 and Apr. 25, 1978, dealing with wireless systems employing spread spectrum techniques; U.S. Pat. No. 4,438,519, issued Mar. 20, 1984, dealing with a narrow bandwidth spread spectrum system using an AC power line as an antenna; U.S. Pat. No. 4,475,208, issued Oct. 2, 1984 for a voice/data spread spectrum system using non-leaky telephone transmission cables; U.S. Pat. No. 4,320,514, issued Mar. 16, 1982, dealing with a spread spectrum FH-MFSK radio receiver for frequency hopped signals; and U.S. Pat. No. 4,672,605, issued June 9, 1987, dealing with a data/voice communication system based on spectrum spreading. For a comprehensive review of spread spectrum technology, the reader is directed to the publication entitled SPREAD SPECTRUM SYSTEMS, edited by Robert C. Dixon, published by John Wiley & Sons, Inc. (1984).

It is the high resistance of spread spectrum systems to interference which essentially makes feasible the implementation of communications systems for operation in the three bands specifically allocated by the Federal Communications Commission (the "FCC") for high power level spread spectrum radio communications. These FCC bands are commonly referred to as the Industrial, Scientific and Medical (ISM) bands and are respectively spread across the frequency ranges of 902–928 MHz, 2400–2483.5 MHz and 5725–5850 MHz. Current spread spectrum radio systems adapted for use with the ISM bands are restricted to simplex or half-duplex communications and typically use quaternary phase shift keying (QPSK) for carrier modulation if bandwidth conservation measures are required. Such radio systems are based on frequency spreading across individual ISM bands and, because of their half-duplex nature, require complex control procedures for both computer data network and voice applications.

More importantly, conventional spread spectrum systems are incapable of supporting full-duplex communications because the available bandwidth is too narrow to provide sufficient isolation between the duplexed transmit and receive signals without the use of inordinately complex and costly filtering arrangements and modulation systems having short roll-off band skirts. Further, commercial spread spectrum radios are incapable of convenient interfacing to related digital communications services, such as the Integrated Services Digital Network (ISDN), primarily due to data rate incompatibility.

In addition, systems which use frequency spreading across separate ISM bands are inherently complex and costly and have restricted use in applications where cost and environmental constraints dictate the provision of bi-directional radio communications within a single ISM band. A classic example of such an application is a spread spectrum communication environment using a leaky feeder wherein the substantial attenuation losses at higher frequencies (of the order of about 2 GHz) entail prohibitive system costs due to the need for closely spread distributed line amplifiers, thereby effectively restricting the operation of the system to the lowest of the ISM bands or perhaps, at best, to the two lower ISM bands.

SUMMARY OF THE INVENTION

It is a general object of the present invention to provide an improved spread spectrum communications system adapted for full-duplex communications on FCC-allocated ISM bands.

A specific object of this invention is to provide a full-duplex communications system wherein spectrum spreading is realized across predefined sub-bands within a specific ISM band.

A related object of the present invention is to provide a full-duplex, sub-band spread spectrum system of the above type which is particularly suited for being integrated with and/or interfaced to related digital communication services, such as the ISDN.

A further object of this invention is to provide a full-duplex, sub-band spread spectrum communications system of the aforementioned type which is suited for providing radio coverage with both antenna and leaky feeder applications.

Yet another object is to provide a spread spectrum communication system of the above kind which utilizes simplified control procedures for both computer data network and voice applications and which can be implemented economically for frequency spreading within a single ISM band without resort to complex and expensive filtering and modulation arrangements.

Briefly, in accordance with the principles of the present invention, the above-enumerated and other associated objects and advantages are realized by the provision of a spread spectrum system adapted for full-duplex voice/data radio communications within a single specified FCC ISM band. Spectrum spreading is performed across a plurality of sub-bands contained within a prescribed FCC spread spectrum communications band. For a prescribed FCC ISM band, at least two sub-bands (the "lower" and the "upper" sub-bands) are defined relative to the center frequency of the ISM band. The lower sub-band is defined about a corresponding first center frequency and has spectral roll-off characteristics sufficient to meet FCC requirements for radio frequency ("RF") radiation outside the ISM band on the lower band-edge of the ISM band. Similarly, the upper sub-band is defined about a corresponding second center frequency and has spectral roll-off characteristics sufficient to meet FCC requirements for RF radiation on the upper band-edge of the ISM band.

Full-duplex operation is realized by the use of digital minimum shift keying (MSK) modulation and associated filtering in order to conserve available bandwidth and accommodate the filtered, modulated signal within the prescribed ISM frequency band. The full-duplex capability makes possible the use of simplified control procedures for both computer data network applications and voice applications and permits implementation of control schemes suitable for use in full-duplex as well as half-duplex and simplex communications environments. The specification of sub-bands within a single ISM band which have spectral roll-offs conforming to FCC requirements at both band edges supports simultaneous transmission along both the transmit and receive directions with adequate filtering to achieve the necessary isolation between the transmit and receive bands.

According to a feature of this invention, the full-duplex, sub-band spread spectrum system is adapted to being integrated with related digital communications services by the specification of a data rate which is consistent with the rate associated with such services. In an illustrative embodiment, the spread spectrum system of this invention uses a data rate of 64 kilo bits per second (kbps), a rate corresponding to that specified for the standard voice/data channel of the Integrated Services Digital Network (ISDN). Accordingly, portable radio stations embodying the present full-duplex, sub-band system can conveniently be interfaced with ISDN circuits to establish the desired radio communication links therebetween.

BRIEF DESCRIPTION OF THE DRAWINGS

Other objects and advantages of the present invention will become apparent upon reading the following detailed description and upon reference to the drawings in which.

While the invention is susceptible to various modifications and alternative forms, specific embodiments thereof have been shown by way of example in the drawings and will herein be described in detail. It should be understood, however, that it is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE PREFERRED EMBODIMENTS

Figure 1:
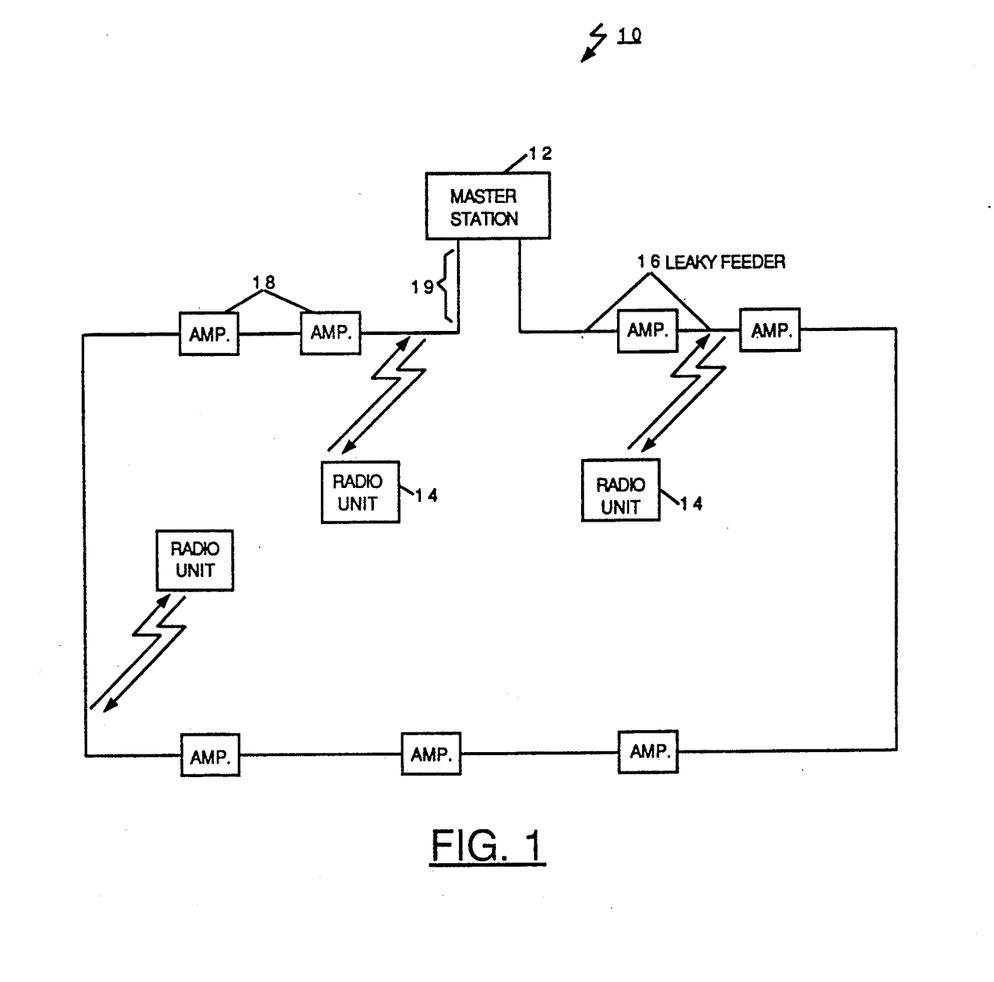
FIG. 1 is a block diagram of a radio communications arrangement wherein the full-duplex, sub-band spread spectrum system according to this invention may be used advantageously.

Referring now to the drawings and specifically to FIG. 1, there is shown a representative block diagram of a RF communications system 10 wherein spectrum spreading is used to establish bi-directional radio communications between at least one master base station 12 and a plurality of slave stations or radio units 14 disposed within the prescribed area of RF coverage of the master station. The desired two-way radio communications link is established by using a first band of frequencies for communication from the master station 12 to the radio units 14, i.e., along the "transmit" direction, and the use of a second separate band of frequencies for communication from the radio units 14 to the master station 12, i.e., along the "receive" direction.

Actual coupling of RF signals between the master station 12 and the radio units 14 can be accomplished in several ways. By way of illustration only, the representative system of FIG. 1 shows an arrangement wherein a plurality of lengths of leaky feeder 16 are used to establish an intermediary RF communications link between the master station 12 and the radio units 14. More specifically, the leaky feeder is in the form of radiating cable of the slotted type wherein slots disposed on the metallic outer conductor of the cable permit a controlled portion of the electromagnetic signals being transmitted therethrough to radiate along the length of the cable so that any radio units 14 disposed in the vicinity of such leaky feeder lengths may receive the signals being radiated therefrom. The leaky feeder approach is particularly advantageous in bi-directional communication systems because electromagnetic signals transmitted near the feeder lengths are directly coupled into the radiation slots and carried back along the length of the cable to the master base station. Accordingly, RF signals transmitted by mobile or portable radio units in the RF coverage area of the master station 12 can be picked up directly by the feeder and relayed to the master station.

In such a bi-directional communications system, conventional non-radiating coaxial cable lengths 19 may be used for relaying RF signals in areas where the RF signals only need to be transmitted and not radiated. For instance, in deploying such a system for establishing RF communications within an enclosed tunnel area, conventional coaxial cable may be used to feed signals to and from the master station and the leaky feeder or radiating cable lengths disposed within the tunnel area for transmission to and reception from radio units located within that area.

As shown in FIG. 1, the radio communications system may employ a series of distributed amplifiers 18 for boosting the transmitted RF signals at periodic intervals over the RF coverage area in order to counteract the loss in signal level inherently resulting from cable attenuation losses, particularly at higher operating frequencies. The distributed amplifiers 18 link the plurality of radiating cable lengths 16 and are typically bi-directional so as to be capable of accommodating and amplifying signals propagating along the cable lengths in both the transmit and receive directions. The amplifiers include an amplification stage (not shown) which provides a fixed amount of gain for the propagated RF signals in each signal direction.

In a communications system of the above type using lengths of leaky feeder to establish the bi-directional RF communications link, the loss in signal level resulting from attenuation losses inherent to the feeder severely restricts the length of cable over which RF signals may be propagated without degradation of the transmitted signals below a requisite threshold level. The cable attenuation losses are particularly problematic at higher frequencies on the order of two Gigahertz. Consequently, the requisite spacing between the booster amplifiers required to maintain the threshold signal level becomes increasingly small, thereby making the system prohibitively costly. As a result, in such a communications environment, operation of a spread spectrum system becomes more difficult in the 2400-2483.5 MHz ISM band and impracticable in the upper FCC ISM band of 5725-5850 MHz. The cost and environmental constraints in such cases dictate the operation of the spread spectrum system within the lowest of the ISM bands, i.e., within the frequency range of 902-928 MHz.

In conventional spread spectrum communications systems, the above restriction effectively precludes the possibility of full-duplex communications. More specifically, in conventional radio communications systems, for instance, in cellular telephone applications, duplex operation is generally realized by separating the transmit and receive bands by a bandwidth commensurate with commercially available filter technology. Typically, the frequency bands for the duplexed signals are separated by a factor of about 45 MHz in order to achieve the requisite degree of signal isolation between the transmit and receive bands. However, such systems are not adapted for full-duplex operations because the available bandwidth of 26 MHz in the lowest FCC ISM band of 902-928 MHz is too narrow to accommodate the commonly used frequency separation and, hence, the required isolation between the duplexed signals cannot be realized without resorting to relatively complex and costly filtering arrangements and/or data modulation techniques which yield short roll-off band skirts.

In accordance with the system of the present invention, a spread spectrum communications system adapted for full-duplex operation is realized by frequency spreading the RF signals to be transmitted across separate sub-bands defined within a single specified FCC ISM band. More specifically, at least two sub-bands (the "lower" and the "upper" sub-bands) are defined within each of the FCC ISM bands in which the spread spectrum system is adapted to operate. The lower sub-band is defined about the lower band-edge of the prescribed ISM band and has a center frequency $F_1$ and spectral roll-off characteristics sufficient to meet FCC requirements for RF radiation outside the ISM band on the lower band-edge of the ISM band. Similarly, the upper sub-band is defined about the upper band-edge of the prescribed ISM band and has a center frequency $F_2$ and spectral roll-off characteristics sufficient to meet FCC requirements for RF radiation on the upper band-edge of the ISM band.

Figure 2:
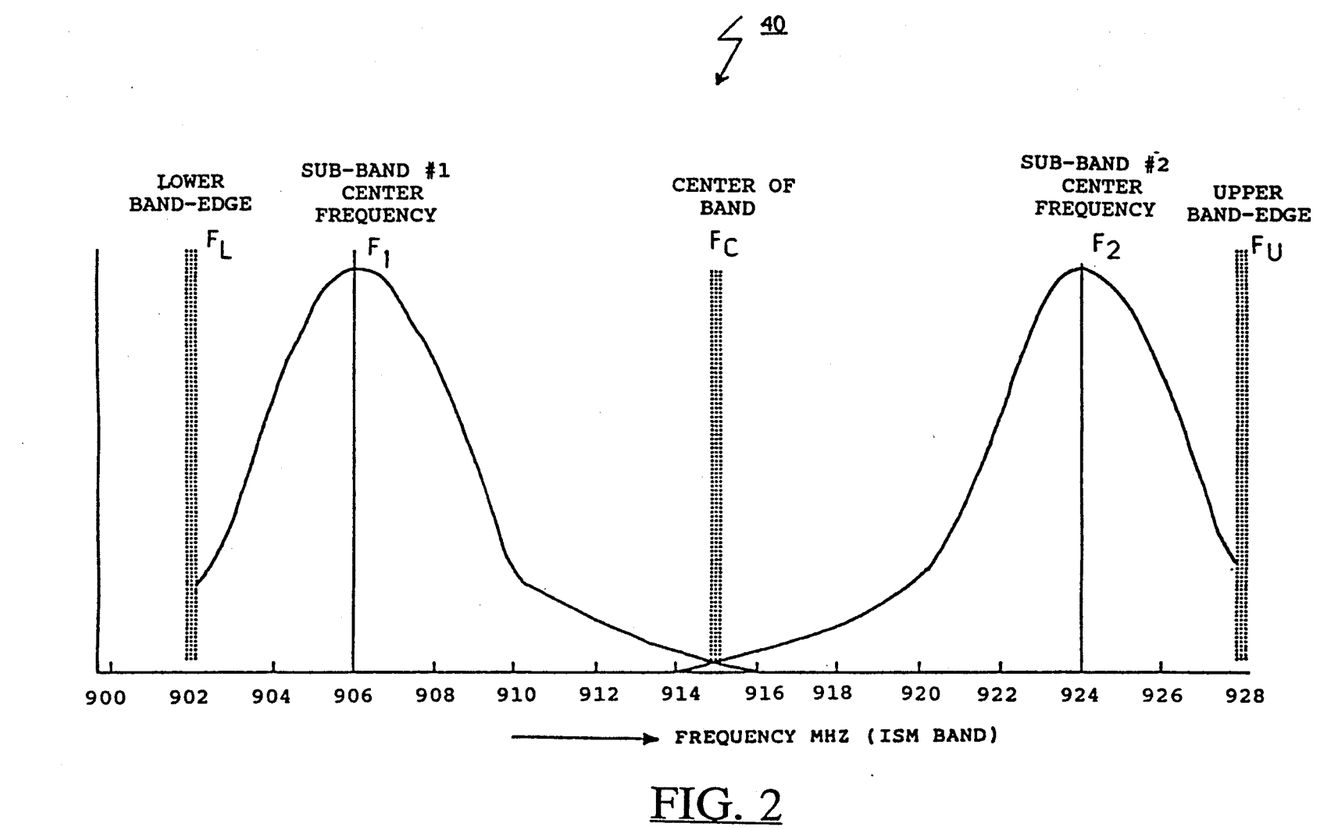
FIG. 2 is graphical representation of the definition of sub-bands within a single FCC ISM band in accordance with the full-duplex, sub-band spread spectrum system of this invention.

A specific sub-band arrangement particularly adapted for frequency spreading within the lowest ISM band is shown at FIG. 2. As illustrated therein, the frequency band selected for full-duplex spread spectrum communications is the lowest ISM band spread across the frequency range of 902-928 MHz. Thus, the lower band-edge of the prescribed ISM band is defined at a frequency $F_L$ equal to 902 MHz and an upper band-edge defined at a frequency $F_U$ equal to 928 MHz. The center of the prescribed ISM band is defined at a center frequency $F_C$ equal to 915 MHz.

For sub-band operation within the prescribed ISM band, the lower sub-band is defined across a frequency band of 902-910 MHz and the upper sub-band is defined across a frequency range of 920-928 MHz. Such sub-bands can be specified either by the appropriate range of frequencies or by the specification of the center frequency and the corresponding bandwidth. The bandwidth, in turn, may be specified in terms of either the absolute bandwidth or the 3-dB bandwidth. The lower sub-band is defined at a center frequency $F_1$ equal to 906 MHz and has spectral roll-off characteristics sufficient to meet FCC requirements for RF radiation outside the ISM band on the 902 MHz lower band-edge. More specifically, the lower sub-band is defined to have a short roll-off characteristic about the lower band-edge (i.e., about the frequency $F_L$) so that signals falling outside the band-edge frequency $F_L$ are sufficiently rejected.

On a similar basis, the upper sub-band is defined at a center frequency $F_2$ equal to 924 MHz and has spectral roll-off characteristics sufficient to meet FCC requirements for RF radiation outside the ISM band on the 928 MHz upper band-edge. More specifically, the upper sub-band is defined to have a short roll-off band skirt about the upper band-edge (i.e., about the frequency $F_U$) so that signals falling outside the band-edge frequency $F_U$ are sufficiently rejected.

As evident from FIG. 2, the band-skirt characteristics of the upper and lower sub-bands about the center of the ISM band (i.e., about the frequency $F_C$) have sharp attenuation factors and are defined to be such that there is negligible interference between signals existing within the two sub-bands. Accordingly, the lower and upper sub-bands can be used for substantially interference-free duplex transmission of spread spectrum transmit and receive signals within the single prescribed ISM band.

On a basis similar to that prescribed in connection with FIG. 2, sub-bands may be defined for full-duplex, sub-band spread spectrum operation in the remaining two ISM bands. It should be noted that the frequencies illustrated herein and specifically shown in FIG. 2 for full-duplex operation are for illustrative purposes only. Although frequencies prescribed by the FCC for the ISM bands (and used herein as the basis for sub-band definition) are internationally recognized and used by virtue of the official imprimatur of the International Telegraphy and Telephony Consultative Committee (C.C.I.T.T.), the sub-band operation principles described herein can conveniently be applied to other RF communications frequency bands.

Figure 3:
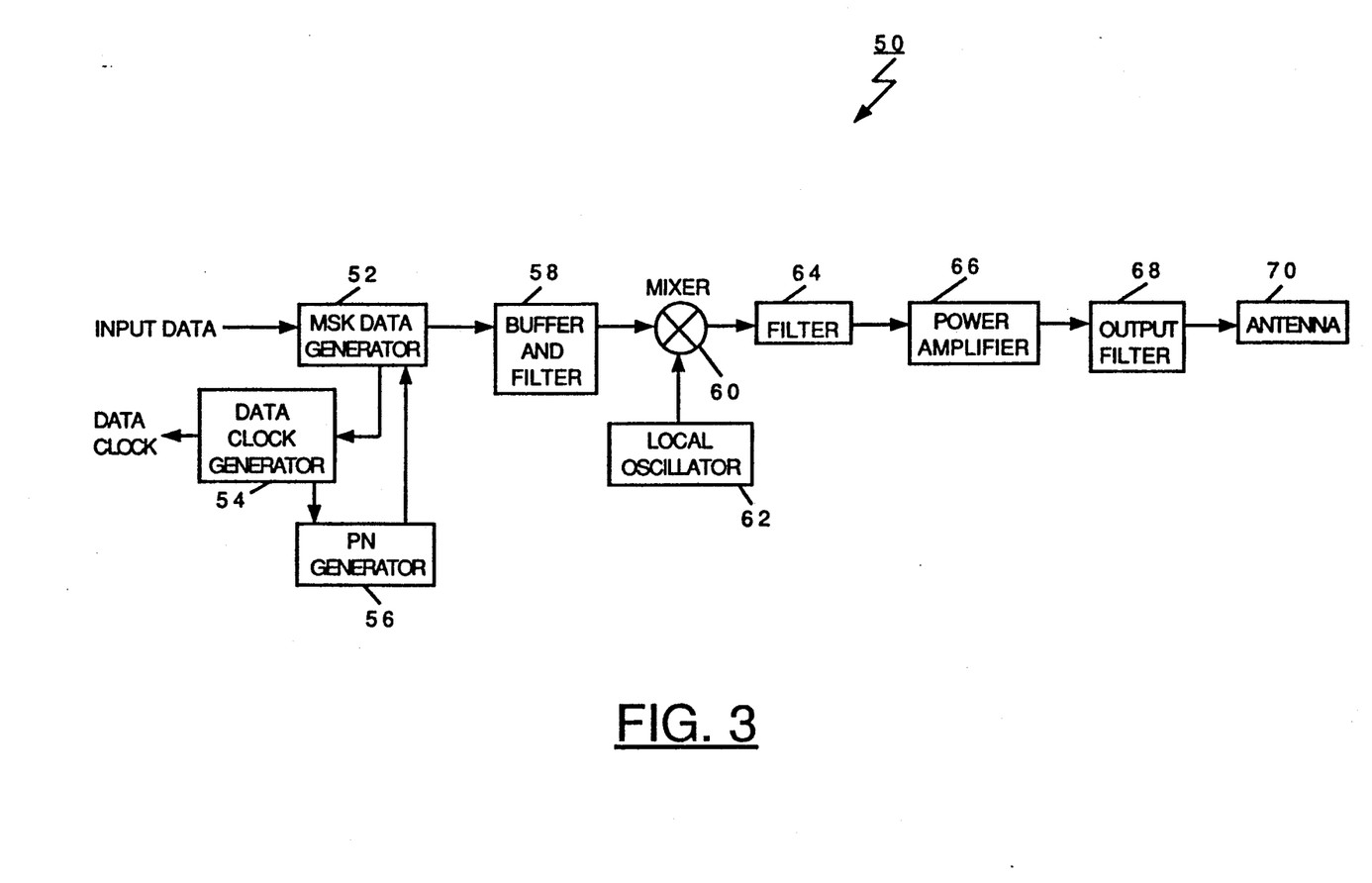
FIG. 3 is a modular block diagram of a spread spectrum transmitter, according to an illustrative embodiment of the present invention.

Referring now to FIG. 3, there is shown an illustrative embodiment in block diagram format of a spread spectrum transmitter adapted for use with the system of the present invention. As shown therein, the transmitter 50 receives input data that needs to be transmitted at a data modulator 52 which is adapted to process the data according to a predefined modulation arrangement. According to a preferred embodiment of this invention, the data modulator 52 is in the form of a minimum shift keying (MSK) data generator specifically adapted for optimum bandwidth conservation. An exemplary implementation of the MSK data generator 52 for digitally modulating the data to be transmitted is illustrated in FIG. 4.

Figure 4:
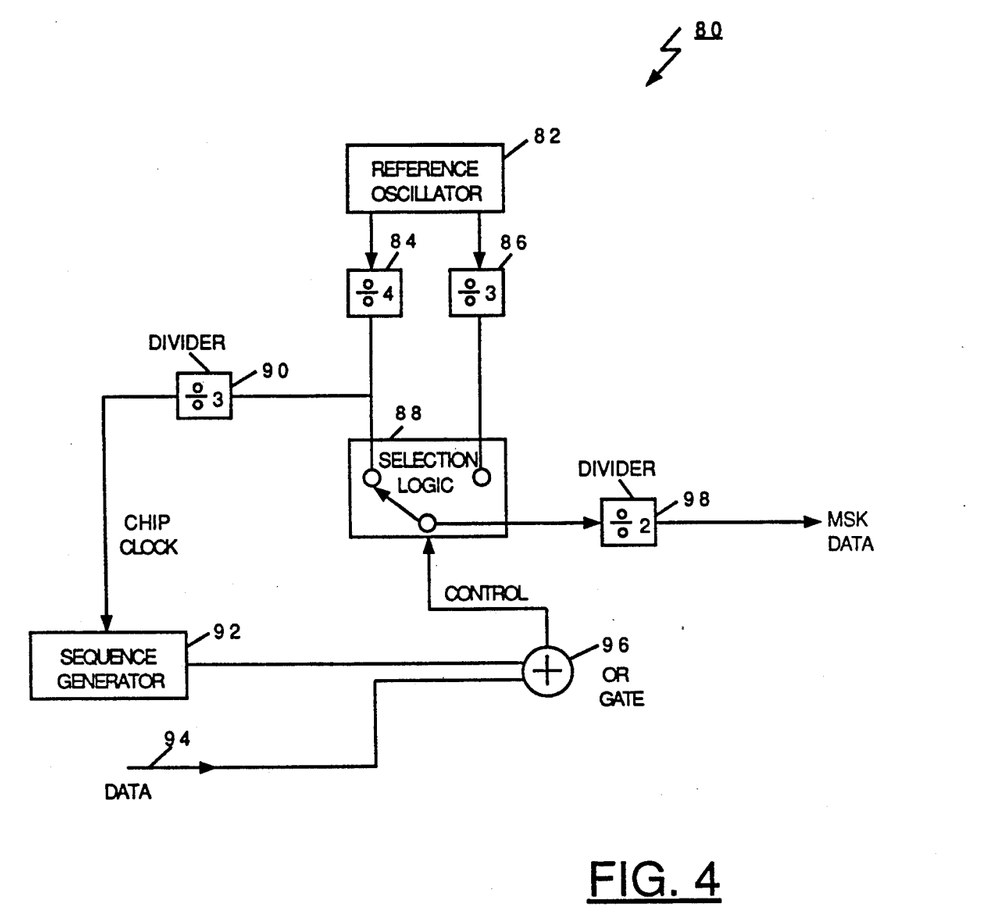
FIG. 4 is a block diagram of an exemplary arrangement for digitally generating the modulation used for implementing the full-duplex, sub-band system of this invention.

The MSK generator 80 illustrated in FIG. 4 is adapted to generate a continuous phase shift modulated waveform for direct sequence coding of input data in the spread spectrum system of FIG. 2. The MSK waveform consists of a sequence of contiguous pulses, each of which is a short pulse at one of two different frequencies. Such a modulated waveform has the advantage of realizing lower spectral sidelobes and, thus, lower cross-channel interference, than other modulation techniques, such as quaternary phase shift keying (QPSK).

In the arrangement of FIG. 4, the MSK signal generator is performed digitally by the selective combination of a reference oscillator signal with appropriate divider elements. More specifically, a reference oscillator 82 generates an output signal which is fed to separate divider elements 84 and 86, the output of which can be controllably selected on the basis of a control signal directed to a selection logic unit 88 connected thereto. The divider 84 is a divide-by-four unit, the output of which is connected to another divider 90 which is a divide-by-three unit in order to effectively generate a signal constituting the sequence chip clock which is used to drive a sequence generator 92.

The output of the generator 92 constitutes the spreading code sequence which is combined with the incoming data 94 at an Exclusive-OR gate 96 to generate a control signal which drives the selection logic 88 so as to appropriately select one of the divider elements 84 and 86 to act upon the reference signal from the oscillator 82. The selected output from the selection logic 88 is subjected to a divide-by-two operation by a divider unit 98 so as to establish a modulation index of 0.5. Consequently, the output of the divider unit 98 constitutes the MSK data to be processed and transmitted by the transmitter of FIG. 3.

Returning now to FIG. 3, the MSK data generated by the data generator 52 is supplied through a buffer and filter unit 58 to a mixer 60 which receives a reference oscillator signal from a local oscillator 62. The function of the mixer 60 is to shift the frequency of the input MSK data stream up to an acceptable frequency range corresponding to the appropriate FCC-prescribed ISM frequency band. The buffer and filter unit 58 functions to remove any sidelobes and undesired generated signals which, when combined with the local oscillator signal at the mixer 60, would spill-over or spread outside the permitted transmission bandwidth.

The up-converted signals generated at the mixer 60 are processed by a filter 64 in order to eliminate any out-of-band signals generated by the mixing process itself. Subsequently, the filtered signals are amplified by a power amplifier 66 to the requisite power level consistent with the limits prescribed by corresponding FCC regulations. The amplified signals are then processed by an output filter 68 to remove any unwanted energy generated during the amplification process for various reasons, including sidelobe regeneration. The filtered signal from the output filter 68 is then fed to an antenna 70 which functions as means for radiating the spread spectrum signals therefrom.

In the transmitter arrangement of FIG. 3, clock signals from the MSK generator 52 are fed to a data clock generator 54 for generating pseudo-random noise (PN) sequence clocks and data clocks for controlling the input and output data streams. The PN sequence clock from the clock generator 54 is fed to a PN generator 56 which generates the pseudo-random noise sequence necessary for achieving the MSK modulation. The transmitter arrangement described above achieves the requisite transmission bandwidths at high transmitter efficiency while maintaining appropriately low amounts of group delay distortion. The operation of the clock generator 54 and the PN generator 56 in spectrum spreading is well known in the art and, accordingly, is not described in detail herein.

Figure 5:
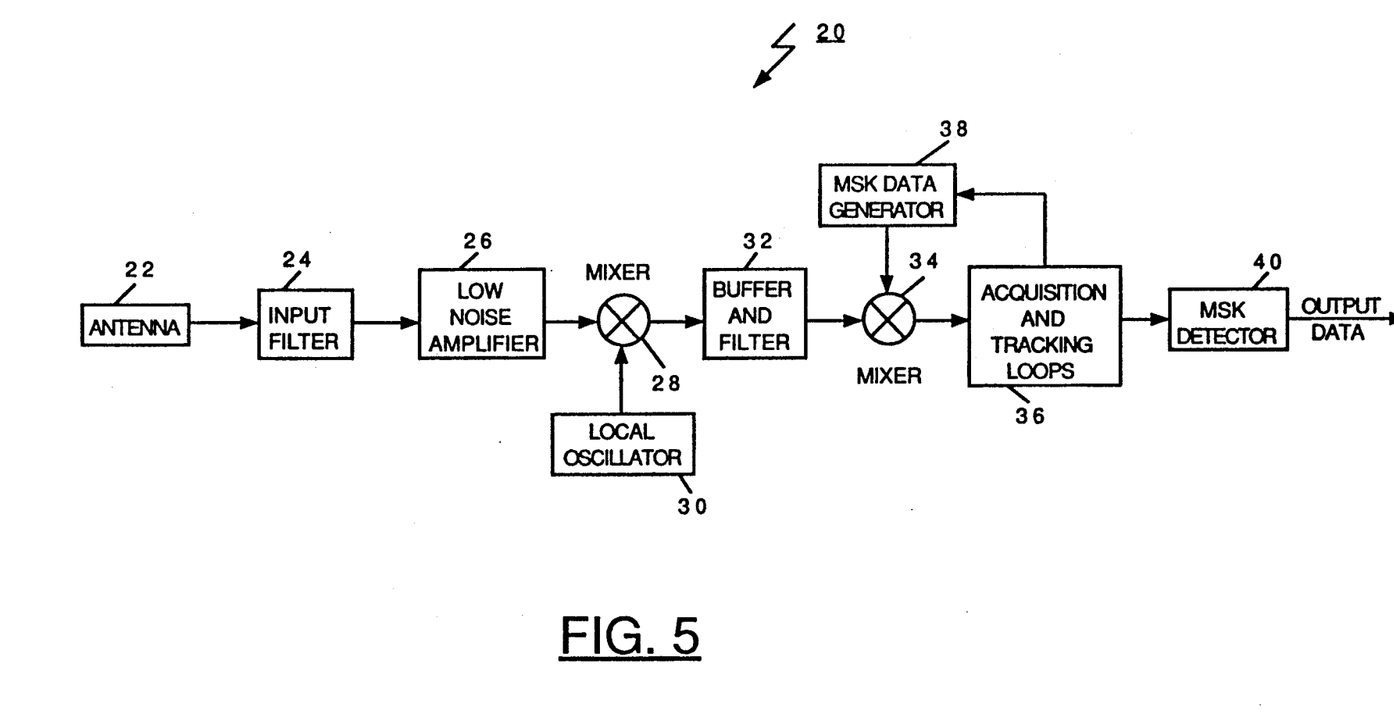
FIG. 5 is a modular block diagram of an illustrative embodiment of a spread spectrum receiver adapted for use with the illustrative transmitter of FIG. 3.

Referring now to FIG. 5, there is shown an illustrative embodiment of a spread spectrum receiver for use in conjunction with the illustrative transmitter of FIG. 3, in accordance with the system of the present invention. As shown therein, the receiver 20 includes an antenna 22 for reception of the spread spectrum RF signals radiated from the transmitter antenna 70. It should be noted in this regard that, with the leaky feeder communication environment illustrated in FIG. 1, the radiating cable lengths 16 themselves function as the transmitting and receiving antennas. Radiated spread spectrum signals are picked up by the receiver antennas within radio units 14 disposed in the vicinity of such radiating cable lengths.

The received RF signals are processed by an input filter 24 to remove any unwanted transmitted energy before relaying the received signals to a low noise amplifier 26 which amplifies the inherently low-energy spread spectrum RF signals prior to the recovery or de-spreading process. The output of the amplifier 26 is fed to a mixer 28 which receives a reference signal from a local oscillator 30 for down-converting the received RF frequency to an intermediate frequency appropriate for the detection process. Subsequently, the down-converted signals are fed to a buffer and filter unit 32 which eliminates any undesired signals generated by the mixing process which may subsequently degrade the detection process.

De-spreading of the received spread spectrum signals is realized at the receiver by combining the received signals at a mixer 34 with the output of a data generator 38 which corresponds to the generator used in the transmitter. In the preferred embodiment of FIG. 5, the generator 38 is an MSK data generator. The data generator 38 functions to de-spread the spread spectrum signal for acquisition and tracking based on control signals provided by an acquisition and tracking loop unit 36 in order to duplicate the pseudo-random sequenced data and, thus, precisely locate the spread spectrum signal. Subsequently, a detector 40 corresponding to the type of modulation used for spectrum spreading is used to recover the original data stream from the de-spread data to yield the final output data at the receiver. In the receiver embodiment of FIG. 5, the detector 40 is an MSK detector. The acquisition and tracking loop unit 36 and the MSK detector 40 are conventional and, accordingly, are not described in detail here.

It should be noted that the action of the filters at the transmitter end as well as the receiver end is important in permitting the transmission of the duplexed transmit and receive signals in the sub-bands defined within the single prescribed ISM band without interfering with full-duplex communications. Sufficient isolation between the transmit and receive bands is achieved for supporting sub-band, full-duplex spread spectrum communications by realizing the sub-band roll-off characteristics described above in connection with the definition of the lower and upper sub-bands shown in FIG. 2.

In accordance with a feature of the present invention, the above-described full-duplex, sub-band spread spectrum system is adapted for being conveniently interfaced with related digital communications services by the specification of a data rate which is compatible with the rate associated with such services. Presently available commercial spread spectrum radios are designed for being interfaced to synchronous devices at data rates consistent with such interfaces. The nominal data rates commonly used are up to 38.4 kilo bits per second (kbps). In cases where the spread spectrum radios are designed for maximum use of a half-duplex channel in the lowest ISM band (902–928 MHz), data rates of approximately 200 to 240 kbps have been used. A major disadvantage with such conventional radio implementations is the incompatibility of the specified data rates with common digital communication services. In particular, commercial spread spectrum radios are incapable of being interfaced to the Integrated Services Digital Network (ISDN).

According to an illustrative embodiment, the spread spectrum system of this invention is operated at a specified data rate of 64 kilo bits per second (kbps), a rate corresponding to that specified for the standard voice/data channel of the ISDN. Consequently, it becomes possible for portable radio units embodying the full-duplex, sub-band system of this invention to be conveniently interfaced with an ISDN unit so as to advantageously establish a radio communication link therebetween.

From the foregoing, it will be apparent that the present invention provides an improved spread spectrum communications system capable of full-duplex operation in a single ISM band. The system is applicable in both "leaky feeder" applications (as discussed in connection with the communications environment of FIG. 1) and "antenna" applications for providing radio coverage for such facilities as tunnels, buildings, factories, warehouses, etc. The full-duplex, sub-band spectrum spreading system is equally applicable in the transfer of data and/or voice communications in outdoor applications such as vehicle telemetry for both military and commercial test vehicles, high-performance race cars, automated guided vehicles, etc. The system is particularly applicable in a wired communication environment within an enclosed area, such as a factory, for establishing bi-directional spread spectrum radio communications between a centralized computer station and various radio units linked to process or manufacturing control stations, inspection units, inventory control stations, etc.

What is claimed is:

1. A full-duplex, sub-band spread spectrum communications system adapted for radio communications within a prescribed restricted frequency band, said system comprising:

at least one master station for providing RF coverage within a prescribed area;

a plurality of radio units disposed within the prescribed RF coverage area; and means for relaying RF signals between said master station and said radio units;

said master station and each of said radio units including transmitter means for processing input data and generating spread spectrum signals for being transmitted over said RF signal relaying means; and receiver means for receiving said transmitted spread spectrum signals from said relaying means and de-spreading said received signals to extract the original data therefrom;

said spread spectrum signals transmitted from said master station to said radio units (the "transmit" signals) being confined to a first frequency sub-band defined within said restricted frequency band, and spread spectrum signals transmitted from said radio units to said master station (the "receive" signals) being confined to a second frequency sub-band which is also defined within said specified frequency band, said first and second frequency sub-bands being defined about different band-edges of said restricted frequency band.

2. The spread spectrum communications system as set forth in claim 1 wherein said restricted frequency band is the 902–928 MHz band.

3. The spread spectrum communications system as set forth in claim 2 wherein said first frequency sub-band is defined across the frequency range of 902–910 MHz and said second frequency sub-band is defined across the frequency range of 920–928 MHz.

4. The spread spectrum communications system as set forth in claim 1 wherein said transmitter means includes means for generating said spread spectrum signals by modulating the input data by minimum shift keying.

5. The spread spectrum communications system as set forth in claim 1 wherein the system is adapted to being interfaced with a separate digital communications system, such as the Integrated Digital Services Network (ISDN), by transmitting and receiving said spread spectrum signals at a data rate consistent with that of said digital communications system.

6. The spread spectrum communications system as set forth in claim 5 wherein the transmission and reception of spread spectrum signals occurs at a data rate of 64 kbps.

7. A method for establishing full-duplex spread spectrum RF communications within a prescribed restricted frequency band between at least one master station adapted to provide RF coverage within a prescribed area and a plurality of radio units disposed within the prescribed RF coverage area and adapted for simultaneously receiving RF signals in a given frequency band, the method comprising the steps of:

providing means for relaying RF signals between the master station and the radio units;

processing input data to generate spread spectrum signals which are confined to a first frequency sub-band defined within said restricted frequency band for signal transmission from said master station to said radio units, and to a second frequency sub-band which is also defined within said specified frequency band for signal transmission from said radio units to said master station, said first and second frequency sub-bands being defined to be non-overlapping within said restricted frequency band;

transmitting said spread spectrum signals over said RF signal relaying means; and receiving said transmitted spread spectrum signals from said relaying means and de-spreading said received signals to extract the original input data therefrom wherein said restricted frequency band is one of the following frequency bands: 902–928 MHz; 2400–2483.5 MHz; and 5725–5850 MHz.

8. The full-duplex spread spectrum communications method as set forth in claim 7 wherein said restricted frequency band is the 902–928 MHz band.

9. The full-duplex spread spectrum communications method as set forth in claim 8 wherein said first frequency sub-band is defined across the frequency range of 902–910 MHz and said second frequency sub-band is defined across the frequency range of 920–928 MHz.

10. The full-duplex spread spectrum communications method as set forth in claim 7 wherein said spread spectrum signals are generated by modulating the input data by minimum shift keying.

11. The full-duplex spread spectrum communications method as set forth in claim 7 wherein the system is adapted to being interfaced with a separate digital communications system, such as the Integrated Digital Services Network (ISDN), by transmitting and receiving said spread spectrum signals at a data rate consistent with that of said digital communications system.

12. The full-duplex spread spectrum communications method as set forth in claim 11 wherein the transmission and reception of spread spectrum signals occurs at a data rate of 64 kbps.

13. In a spread spectrum RF communications system for transmission and reception of RF signals between at least one master station providing RF coverage within a prescribed area and a plurality of radio units disposed therein and adapted for simultaneously receiving RF signals in a given frequency band, the communications occurring over means for relaying RF signals between the master station and the radio units, the improvement comprising:

means for full-duplex, sub-band transmission and reception of input RF signals between said master station and said radio units by frequency spreading the input signals within a single prescribed restricted frequency band, said means including transmitter means for generating frequency spread signals for being transmitted over the RF signal relaying means, said signals being confined to (i) a first frequency sub-band defined within said restricted frequency band when signals are transmitted from said master station and (ii) a second frequency sub-band also defined with said restricted frequency band when signals are transmitted from said radio units, said first and second frequency sub-bands being defined to be non-overlapping within said restricted frequency band, and receiver means for receiving and processing said transmitted frequency spread signals to extract the input signals from the corresponding one of said first and second frequency sub-bands wherein said restricted frequency band is one of the following frequency bands: 902–928 MHz; 2400—2483.5 MHz; and 5725-5850 MHz.

14. The improved full-duplex spread spectrum communications system according to claim 13 wherein said restricted band is the 902–928 MHz band.

15. The improved full-duplex spread spectrum communications system according to claim 14 wherein said first frequency sub-band is defined across the frequency range of 902–910 MHz and said second frequency sub-band is defined across the frequency range of 920–928 MHz.

16. The improved full-duplex spread spectrum communications system according to claim 13 wherein said transmitter means includes means for generating said spread spectrum signals by modulating the input data by minimum shift keying.

17. The improved full-duplex spread spectrum communications system according to claim 13 wherein the system is adapted to being interfaced with a separate digital communications system, such as the Integrated Digital Services Network (ISDN), by transmitting and receiving said spread spectrum signals at a data rate consistent with that of said digital communications system.

18. The improved full-duplex spread spectrum communications system according to claim 17 wherein the transmission and reception of spread spectrum signals occurs at a data rate of 64 kbps.

* * * * *